US009696864B2

(12) United States Patent
Lippmann et al.

(10) Patent No.: US 9,696,864 B2
(45) Date of Patent: Jul. 4, 2017

(54) DETERMINATION OF A TERMINAL'S POSITION FOR DISPLAYING A GUI ELEMENT

(71) Applicant: Roche Diagnostics Operations, Inc., Indianapolis, IN (US)

(72) Inventors: Jens Lippmann, Zurich (CH); Christopher Schofield, Huenenberg (CH); Urs Suter, Zurich (CH); Bernard Von Allmen, Seengen (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 422 days.

(21) Appl. No.: 13/772,482

(22) Filed: Feb. 21, 2013

(65) Prior Publication Data

US 2013/0232425 A1    Sep. 5, 2013

(30) Foreign Application Priority Data

Mar. 2, 2012 (EP) .................................... 12157836

(51) Int. Cl.
*G06F 3/00* (2006.01)
*G06F 3/048* (2013.01)
*G06F 21/62* (2013.01)

(52) U.S. Cl.
CPC ............ *G06F 3/048* (2013.01); *G06F 21/629* (2013.01); *G06F 2221/2111* (2013.01)

(58) Field of Classification Search
CPC ........... G06F 21/629; G06F 2221/2111; G06F 3/048; G06F 3/0481–3/0489

USPC ...... 715/741, 740, 743, 736, 734; 726/27, 4, 726/6, 29, 30
See application file for complete search history.

(56) References Cited

U.S. PATENT DOCUMENTS

| 5,521,845 | A | | 5/1996 | Ukon et al. |
| 5,548,764 | A | * | 8/1996 | Duley et al. .................. 713/310 |
| 5,550,968 | A | * | 8/1996 | Miller et al. .................. 715/741 |
| 5,841,975 | A | * | 11/1998 | Layne et al. .................. 709/203 |
| 5,897,989 | A | * | 4/1999 | Beecham .......................... 435/5 |
| 6,002,427 | A | * | 12/1999 | Kipust .......................... 348/156 |
| 6,085,227 | A | * | 7/2000 | Edlund et al. ................ 709/203 |

(Continued)

FOREIGN PATENT DOCUMENTS

EP    2249272 A1    11/2010
WO    2006/020042 A1    2/2006

*Primary Examiner* — Steven B Theriault
(74) *Attorney, Agent, or Firm* — Roche Diagnostics Operations, Inc.

(57) ABSTRACT

Computer-implemented method for providing access control to a function of an analyzer is presented. A user's log-in data is received from a first data entry terminal. Information descriptive of a position of the first data entry terminal is obtained. It is determined whether the position of the first data entry terminal is within a physical operating (PO) area of the analyzer. A user activatable position sensitive (PS) GUI element is displayed on the first data entry terminal if the position of the first data entry terminal is determined to be within the PO area. The activatable PS GUI element triggers, upon activation, the execution of the function. The execution of the function comprises the execution of a physical action by the analyzer. The display of the user activatable PS GUI element is otherwise prohibited or a non-activatable PS GUI element indicative of the function is displayed.

16 Claims, 5 Drawing Sheets

(56) References Cited

U.S. PATENT DOCUMENTS

| | | | |
|---|---|---|---|
| 6,246,862 B1* | 6/2001 | Grivas et al. | 455/566 |
| 6,544,476 B1* | 4/2003 | Mimura et al. | 422/67 |
| 6,563,430 B1* | 5/2003 | Kemink et al. | 340/8.1 |
| 6,570,610 B1* | 5/2003 | Kipust | 348/156 |
| 6,594,762 B1* | 7/2003 | Doub et al. | 726/35 |
| 6,792,320 B2* | 9/2004 | Andrews | 700/65 |
| 6,792,321 B2* | 9/2004 | Sepe, Jr. | 700/65 |
| 6,813,473 B1* | 11/2004 | Bruker | 434/350 |
| 6,932,611 B2* | 8/2005 | Shen et al. | 434/276 |
| 6,957,075 B1* | 10/2005 | Iverson | 455/456.3 |
| 6,970,763 B2* | 11/2005 | Kato | 700/180 |
| 6,971,072 B1* | 11/2005 | Stein | 715/866 |
| 7,020,785 B2* | 3/2006 | Kim et al. | 726/36 |
| 7,058,414 B1* | 6/2006 | Rofheart et al. | 455/456.4 |
| 7,170,422 B2* | 1/2007 | Nelson et al. | 340/12.28 |
| 7,185,288 B2* | 2/2007 | McKeever | 715/792 |
| 7,257,374 B1* | 8/2007 | Creigh | 455/41.2 |
| 7,260,094 B1* | 8/2007 | Kenney | 370/389 |
| 7,328,135 B2* | 2/2008 | Linley et al. | 702/188 |
| 7,400,891 B2* | 7/2008 | Aaron | 455/456.4 |
| 7,415,280 B2* | 8/2008 | Taniguchi et al. | 455/456.1 |
| 7,532,965 B2* | 5/2009 | Robillard et al. | 701/36 |
| 7,624,424 B2 | 11/2009 | Morita et al. | |
| 7,674,298 B1* | 3/2010 | Cambridge | 726/35 |
| 7,676,750 B2* | 3/2010 | Lindsey et al. | 715/743 |
| 7,696,905 B2* | 4/2010 | Ellenby et al. | 340/974 |
| 7,796,023 B2* | 9/2010 | Rezvani et al. | 340/506 |
| 7,840,237 B2* | 11/2010 | Panabaker et al. | 455/566 |
| 7,973,657 B2* | 7/2011 | Ayed | 340/539.23 |
| 8,040,757 B2* | 10/2011 | Wakamiya et al. | 368/10 |
| 8,041,437 B2* | 10/2011 | Stellari et al. | 700/65 |
| 8,112,066 B2* | 2/2012 | Ben Ayed | 455/411 |
| 8,351,937 B2* | 1/2013 | Lee | 455/434 |
| 8,761,712 B1* | 6/2014 | Howard | 455/352 |
| 8,907,782 B2* | 12/2014 | Baker et al. | 340/539.12 |
| 2001/0013053 A1* | 8/2001 | Yamazaki | 709/203 |
| 2001/0035729 A1* | 11/2001 | Graiger et al. | 318/587 |
| 2002/0103550 A1* | 8/2002 | Andrews | 700/65 |
| 2002/0147799 A1* | 10/2002 | Alhalabi et al. | 709/220 |
| 2003/0067387 A1* | 4/2003 | Kwon et al. | 340/540 |
| 2003/0140246 A1 | 7/2003 | Kammer et al. | |
| 2004/0034478 A1* | 2/2004 | Yung et al. | 702/19 |
| 2004/0051734 A1* | 3/2004 | Taniguchi et al. | 345/743 |
| 2004/0098581 A1* | 5/2004 | Balfanz et al. | 713/155 |
| 2005/0013736 A1* | 1/2005 | McKeever | G01N 35/0092 422/63 |
| 2005/0035846 A1* | 2/2005 | Zigmond et al. | 340/5.22 |
| 2005/0090267 A1* | 4/2005 | Kotzin | 455/456.4 |
| 2005/0110639 A1* | 5/2005 | Puzio et al. | 340/572.1 |
| 2005/0136509 A1* | 6/2005 | Gholap et al. | 435/40.5 |
| 2005/0179929 A1 | 8/2005 | Jain | |
| 2005/0221841 A1* | 10/2005 | Piccionelli et al. | 455/456.3 |
| 2005/0266857 A1* | 12/2005 | Poikela | 455/456.3 |
| 2006/0068834 A1* | 3/2006 | Jones | 455/550.1 |
| 2006/0210435 A1* | 9/2006 | Alavie et al. | 422/65 |
| 2006/0242276 A1* | 10/2006 | Price et al. | 709/220 |
| 2007/0282997 A1* | 12/2007 | Trochman | 709/224 |
| 2008/0010015 A1 | 1/2008 | Luke et al. | |
| 2008/0125908 A1* | 5/2008 | Sjoberg | 700/247 |
| 2008/0129445 A1* | 6/2008 | Kraimer et al. | 340/5.2 |
| 2008/0134303 A1* | 6/2008 | Rekimoto | 726/4 |
| 2008/0158597 A1* | 7/2008 | Hashimoto et al. | 358/1.15 |
| 2008/0172734 A1* | 7/2008 | Sugimoto et al. | 726/19 |
| 2009/0015371 A1* | 1/2009 | Bocquet et al. | 340/5.2 |
| 2009/0065578 A1* | 3/2009 | Peterson et al. | 235/382 |
| 2010/0081383 A1* | 4/2010 | Takeda | 455/41.2 |
| 2010/0175116 A1 | 7/2010 | Gum | |
| 2010/0287477 A1* | 11/2010 | Maetzler et al. | 715/733 |
| 2011/0165023 A1* | 7/2011 | Eble | 422/68.1 |
| 2011/0191509 A1* | 8/2011 | Johnson et al. | 710/62 |
| 2011/0202269 A1 | 8/2011 | Reventlow | |
| 2011/0250875 A1* | 10/2011 | Huang et al. | 455/418 |
| 2011/0265116 A1* | 10/2011 | Stern et al. | 725/35 |
| 2012/0146918 A1* | 6/2012 | Kreiner et al. | 345/173 |
| 2012/0240220 A1* | 9/2012 | Smith | 726/17 |
| 2013/0127904 A1* | 5/2013 | Dove et al. | 345/629 |
| 2013/0141749 A1* | 6/2013 | Chiba | 358/1.14 |

* cited by examiner

DETERMINATION OF A TERMINAL'S POSITION FOR DISPLAYING A GUI ELEMENT

CROSS-REFERENCE TO RELATED APPLICATIONS

This application is a continuation of EP 12157836.3, filed Mar. 2, 2012, which is hereby incorporated by reference.

BACKGROUND

The present disclosure generally relates to an analysis system for analyzing biological samples and, in particular, to an analysis system receiving user data via a data entry terminal.

Monitoring and controlling analyzers in an analytical laboratory tends to be a highly complex and sometimes also error-prone task, especially if the analytical laboratory comprises a plurality of different analyzers executing a plurality of different analyses on different types of samples in parallel. Consumables, such as, for example, reagents or empty tubes, have to be refilled, failed analyzers have to be repaired and sample tubes having got stuck in a jam have to be assigned to other analyzers. Samples may have to be loaded onto or have to be unloaded from an analyzer, have to be mixed with various reagents, and the like. In many laboratories, not all steps can be executed fully automatically. Thus, there may be some tasks to be executed manually, such as, for example, refilling a reagent, while other tasks are executed automatically, via a menu control of a graphical user interface (GUI) or after an explicit approval of an operator.

The analyzers of an analytical laboratory may respectively comprise a user interface, typically a GUI, allowing a user to directly monitor and control the analyzer. However, using the keyboard and other data entry interfaces locally provided by the respective analyzer is highly time-consuming because the operator has to walk to each of the analyzers which may be located on different corners of the room or even in different rooms. A further disadvantage of this approach is that the operator may easily lose the overview on all the analyses concurrently executed in the lab as he can only focus on one lab device at a time.

Therefore, there is a need for an improved method and analysis system for providing access control to a function of an analyzer.

SUMMARY

According to the present disclosure, a computer-implemented method and system for providing access control to a function of an analyzer is provided. A user's log-in data can be received from a first data entry. The first data entry terminal can comprise a display. The log-in data can authenticate the user. Information descriptive of a position of the first data entry terminal can be obtained. It can be determined whether the position of the first data entry terminal is within a physical operating (PO) area of the analyzer. A user activatable position sensitive (PS) GUI element can be displayed on the display of the first data entry terminal if the position of the first data entry terminal is determined to be within the PO area. The activatable PS GUI element can trigger, upon activation, the execution of the function by the analyzer. The execution of the function can comprise the execution of a physical action by the analyzer. The display of the user activatable PS GUI element can otherwise be prohibited or a non-activatable PS GUI element indicative of the function can be displayed.

Accordingly, it is a feature of the embodiments of the present disclosure to provide an improved method and analysis system for providing access control to a function of an analyzer. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A 'data entry terminal' or 'terminal' as used herein can be any data processing device comprising a display and comprising data inputs that allow a user to enter log-in data and/or to specify a request for executing an analysis. A data entry terminal may be an immobile terminal or a mobile terminal. An immobile data entry terminal may be, for example, data entry input provided by the analyzer, for example, a keyboard, mouse and/or a touch screen. The data entry terminal may likewise be a computer, a netbook or a notebook coupled to the analyzer via a network, whereby the computers, netbook or notebooks may be permanently installed at a particular place in the lab or may also be mobile devices. A graphical user interface (GUI) for entering the log-in data may be provided by software running on the data entry terminal, by the middleware of a laboratory and/or by a laboratory information management system (LIMS).

An 'analyzer' as used herein can encompass a device for executing one or multiple analyses on biological samples such as blood, urine, saliva or other sample types, such as, for example, tissue samples. An analyzer can determine, via various chemical, biological, physical, optical or other technical procedures, a measurement value of the sample or a component thereof. An analyzer can obtain a measurement value of at least one analyte of a sample and can return the obtained measurement value. The list of possible analysis results returned by the analyzer can comprise, without limitation, concentrations of the analyte in the sample, a binary (yes or no) result indicating the existence of the analyte in the sample (corresponding to a concentration above the detection level), optical parameters, DNA or RNA sequences, data obtained from mass spectroscopy of proteins or metabolites, image data obtained, for example from tissue samples, and physical or chemical parameters of various type.

The 'log-in data' can encompass any data entered by a user into a terminal allowing the user to authenticate at one or more analyzers. The log-in data may comprise a user name and a password, biometric data of the user such as a fingerprint, a personal user identifier stored for example in a personal ID card ('ID batch'), a persona user identifier encoded a 2D code (for example, a bar code) printed on the surface of the card, or the like. The expression "log-in data authenticating the user at one or more analyzers" as used herein can imply that that user can use log-in data to prove his or her identity to one or more analyzers of an analysis system in order to be allowed to trigger some functions of the one or more analyzers or to inspect some measurement values or status information returned by the analyzers.

A 'display' may be any kind of electronic display device, in particular a computer screen, for example, a TFT screen, a touch screen or the like.

A 'LPS position' as used herein can be a position of an entity, for example of a terminal, having been determined by a local positioning system. The term 'local positioning system' can be understood in its broadest sense, i.e., any positioning system using a set of devices such as cellular base stations, Wi-Fi access points or the like for determining, by means of triangulation, trilateration or multilateration, the position of an object.

A 'GUI element' can be a data object with attributes that can specify the shape, layout and/or behavior of the object if displayed via a display device. A GUI element can be a standard GUI element such as a button, a text box, a tab, an icon, a text field, a pane, a check-box item or item group or the like. A GUI element can likewise be an image, an alphanumeric character or any combination thereof. A GUI element may be implemented for example in the form of a 'PS GUI element'.

A 'position sensitive (PS) GUI element' as used herein can be a GUI element representing a function of an analyzer, whereby the function can comprise a physical action to be executed by the analyzer when executing the function. A PS GUI element can be a position sensitive GUI element, i.e., a GUI element which can be activatable in dependence on the position of a data entry terminal having received log-in data of a user relative to the analyzer, the terminal comprising a display for displaying the PS GUI element. The activatability of the PS GUI elements may depend on a plurality of different criteria, but at least one of the criteria can be the distance between the terminal and the analyzer. In addition to the activatability, also layout-related properties of a PS GUI element may depend on the distance, for example, the color, the shape, the visibility, the size of the PS GUI element or the like.

A 'physical action' as used herein can be any operation to be executed physically by an analyzer whereby the operation involves the movement of samples, consumables, sample tubes, or components of the analyzer. A physical action may be the opening of a door of the analyzer, the loading or unloading of samples to or from the analyzer, transporting samples or consumables within the analyzer, mixing samples and reagents with each other, or the like. Depending on the embodiment, the opening of a door of an analyzer may comprise automatically opening a door leaf by the analyzer or automatically releasing a lock of a door of the analyzer by the analyzer, thereby enabling a user to manually open the door. The initiation of such physical actions can be potentially harmful if not properly supervised by a user. Harm that can be done can be, for example, damage of hardware, contamination of samples or instruments, injuring or contaminating persons and the like.

A 'physical operating area (PO area)' as used herein can be any area around an analyzer allowing a user to physically interact with the analyzer or to visually monitor the analyzer. According to some embodiments, the boundaries of the area around the analyzer are not farther away from the analyzer than about 2 m. Thus, any person entering log-in data into a terminal positioned within that PO area can be able to physically interact with the analyzer, for example, remove any obstacles from the area in front of the door of the analyzer before triggering any door-open function of the analyzer, or is at least able to visually determine that there are some obstacles which may need to be removed before triggering a physical action of the analyzer. According to other embodiments, a PO area can be used which can be large enough to cover an area within a laboratory room, for example, an area specified by about a 2 m radius around the analyzer. The distance may still allow the user to visually monitor the current status of the analyzer and to move to the analyzer quickly if this should be necessary. Depending on the embodiment, the area may have the shape of a circle, a rectangle or any other polygon. The area may be centered around the center of the analyzer or may be restricted to an area adjacent to one side of the analyzer where a user can execute some physical actions, for example, replace consumables and the like.

The provision of 'access control to a function of an analyzer' as used herein can mean that a user can be allowed or prohibited from triggering some functions of an analyzer. The access may be allowed or prohibited depending on one or more criteria, wherein at least one of the criteria may be the position of the first data entry terminal in respect to a PO area of the analyzer.

In one embodiment, a computer-implemented method for providing access control to a function of an analyzer can comprise receiving a user's log-in data from a first data entry terminal. The first data entry terminal can comprise a display. The log-in data can authenticate the user. The log-in data may authenticate the user at one or more analyzers directly or may authenticate the user at a LIMS or a middleware component adapted for controlling the access to functions of one or more analyzers. Information descriptive of a position of the first data entry terminal can be obtained. Whether the position of the first data entry terminal is within a physical operating (PO) area of the analyzer can be determined. According to some embodiments, this determination can be executed by a control unit for controlling the analyzer. A user activatable position sensitive (PS) GUI element can be displayed on the display of the first data entry terminal when the position of the first data entry terminal is determined to be within the PO area. The activatable PS GUI element can trigger, upon activation, the execution of the function of the analyzer. The execution of the function can comprise the execution of a physical action by the analyzer. The display of the user activatable PS GUI element can otherwise be prohitbited or a non-activatable PS GUI element indicative of the function can be displayed.

These features may be advantageous for various reasons. Screen switching systems known in the art can provide a user with full access control to each of a plurality of instrument workstations. The user may be overloaded by the plurality of different graphical user interfaces (GUIs) generated by each of the instrument workstations respectively. In addition, a user switching to a screen of an instrument workstation located far away from the user, for example, in another room, may allow the user to remotely trigger the execution of a function of one of the instruments without being able to physically interact with or visually inspect the instrument for protecting the instrument or the processed biological samples from harm caused by physical obstacles or any other potential source of hazard. For example, it may happen that a lab worker prepares some biological samples in front of an instrument. If another lab worker remotely triggers the instrument to open its door or to move a robotic arm, the prepared samples may be accidentally wiped off the lab bench by the opening door or the robotic arm. Also, if an erroneously processed sample blocks the instrument, a lab worker remotely controlling the instrument may have no possibility to recognize this and may trigger the loading of additional samples into the blocked instrument.

Thus, embodiments can determine the current position of a user by recognizing where he has entered his log-in data into a data entry terminal. The position of the data terminal into which a user has logged in can reflect the physical position of the user. Based on this (i.e. the common position of the terminal and the user) it can be determined if the current position is close enough to a particular analyzer for allowing the logged-in user to trigger the execution of a—potentially harmful—physical action by the analyzer.

In order to determine the physical location of a user, the user log-in can cover log-in types which can require the physical presence of the user as, for example, manual log-in with a keyboard or presenting a user batch to a reader of the terminal.

Rather than granting or denying a logged-in user access to a particular function of an analyzer according to general access rights, a distance-sensitive access control to functions of an analyzer can be provided. The distance dependent access control can prohibit the remote triggering of a potential harmful function but can allow the triggering of the function from a position close enough to the analyzer for ensuring that the user can physically interact with or at least visually monitor the analyzer.

The position of the first data entry terminal may encompass any information indicative of the location of the first data entry terminal, for example, a geographic position, local positioning system (LPS) data, an identifier of the first data entry terminal having assigned a fixed position and the like. The analyzer may execute one or more functions. If at least one of the functions may be a potentially harmful function, the user can be required to monitor at the start of or during its execution. By automatically determining the position of the first data entry terminal having received log-in data of a user and by displaying GUI elements for triggering the execution of a potentially harmful function of the analyzer selectively via terminals within the PO area of the analyzer, embodiments can be able to provide for a terminal-position-sensitive (and therefore user-position-sensitive) GUI whose content can depend on the respective position of the terminal (and user). If it is determined that the logged-in user is at a terminal within the PO area of the analyzer, the GUI may comprise GUI elements providing full control of some critical functions of the analyzer. If it is determined that the logged-in user is at a terminal not lying within the PO area of the analyzer, the display of the GUI element can be blocked or another GUI element which does not allow the user to execute that critical function can be displayed. Thus, the user can be protected from causing harm to the analyzer as the triggering of functions of the analyzer by a person not being located within physical operation position of the analyzer can be prohibited.

In addition, the prohibition of the displaying of functions a user is not allowed to trigger remotely can protect the user from being overloaded with irrelevant information.

In a further advantageous aspect, compared to systems based on the switching of full screen contents, a more fine-grained access control to functions of one or more analyzers may be provided, because the access control may be executed on the GUI element level, not on the full-screen level. This can allow the provision of menus and windows which may comprise, in addition to the (non) activatable PS GUI element, aggregated information having been derived from a plurality of analyzers. Thus, aggregated information may be combined with one or more GUI elements providing access control to individual functions of individual analyzers in dependence on the current location of the first data entry terminal. Thus, the user can be provided with a global, aggregated view on analysis data gathered from a plurality of analyzers which may help the user to decide if the execution of a particular function of an individual analyzer should be triggered. This may not be possible based on systems employing full screen switching.

According to some embodiments, the control unit can receive time information indicative of a moment in time of submitting the log-in data by the first data entry terminal or of receiving the log-in data by the control unit. Alternatively, the time information may be indicative of a moment in time of submitting a request for executing a function of the analyzer by the first data entry terminal or of receiving the request by the control unit. The control unit, upon having received the time information, can evaluate a timetable specifying one or more time intervals during which specified functions of the analyzer are permitted to be used. If according to the evaluated timetable, the requested function is not permitted to be executed at the indicated moment in time, prohibiting or displaying GUI elements can be executed even if the position of the first data entry terminal is determined to be within the PO area of the analyzer.

According to further embodiments, the control unit can receive user profile data of the logged-in user, for example, from a configuration file. The user profile data can comprise user specific permissions and/or group specific permissions in respect to one or more functions of one or more analyzers. Each of the permissions can specify if the user is allowed to trigger a requested function of the analyzer. If the received permissions do not permit the logged-in user to trigger the requested function, prohibiting or displaying GUI elements can be executed even if the position of the first data entry terminal is determined to be within the PO area.

These embodiments may be advantageous as they may provide for a more fine-grained, user-dependent, time-dependent and/or user-group-dependent access control of one or more functions of an analyzer. The complexity of a GUI may be reduced by prohibiting the display of any GUI element to a user if the user is not permitted to trigger the function represented by the GUI element for any reason.

According to some embodiments, executing the prohibition or display of GUI elements may in addition comprise displaying an indication of the cause of not displaying the activatable PS GUI element. Such a cause may be, for example, a lack of user permissions, the first terminal not lying within the PO area, the requested function being disabled at the time of request, or the like.

According to some embodiments, executing the prohibition or display of GUI elements can further comprise displaying an indication of another data entry terminal lying within the PO area of the analyzer the user has authenticated at and/or of the analyzer that was requested to execute a function. The indication may comprise an indication of a terminal-ID or room ID of the terminal, a picture of the terminal or the like. This may be advantageous as the user can immediately be informed what to do and/or where to go to for triggering the execution of a function by a particular analyzer.

According to some embodiments, obtaining information descriptive of the position of the first data entry terminal can comprises obtaining a terminal-ID of the first data entry terminal. Executing the determination if the position of the first data entry terminal is within a PO area of the analyzer can comprise accessing a configuration comprising a mapping of one or more terminal-IDs to the analyzer, wherein each data entry terminal whose ID is mapped to the analyzer lies within the PO area of the analyzer and determining if the obtained terminal-ID is mapped to the analyzer for determining if the position of the first data entry terminal is within the PO area of the analyzer. Depending on the embodiment, the configuration may be stored in a relational database, in a text file or the like.

The embodiments may be particularly easy to implement as it is not necessary to set up a local positioning system. Each of the data entry terminals may comprise a determination of its own terminal-ID. This ID may be submitted to the control unit together with the log-in data of the user. In addition or alternatively, the terminal-ID of the data entry terminal having received the log-in data may send its terminal-ID together with any request for execution of a function by the analyzer to the control unit of the analyzer. Depending on the embodiment, the mapping may be implemented as a binary file, as a text file, as a relational database, as an XML file or the like. The mapping may be stored to a computer readable storage medium accessible by a control unit of the analysis system. As the mapping may assign each of the terminal-IDs one or more analyzers whose respective PO area can cover a predefined position of the terminal identified by the terminal-ID, the terminal-ID can be indicative of the terminal's position relative to the one or more analyzers. In the case an analysis system comprises multiple analyzers and multiple data entry terminals, the mapping thus may be indicative of the position of each of the terminals relative to each of the analyzers. Thus, the mapping may specify if any one of the terminals receiving entered user data for accessing a function of one of the analyzers can display a GUI element representing the function in the form of a user activatable PS GUI element or in the form of a non-activatable PS GUI element.

According to other embodiments, obtaining information descriptive of the position of the first data entry terminal can comprise obtaining a LPS position of the first data entry terminal. The LPS position can be a position determined by a local positioning system (LPS). Executing the determination if the position of the first data entry terminal is within a PO area can comprise determining a spatial distance of the LPS position of the first data entry terminal relative to the position of the analyzer and determining if the spatial distance is below a spatial distance threshold. The spatial distance threshold can specify a maximum distance between a terminal (and a user entering data into the terminal) and an analyzer which still allows the user to physically interact with the analyzer.

According to some embodiments, each data entry terminal can automatically determine its own position. This may be based on exchanging data with one or more other computers and/or base stations of a surrounding local positioning system. The determined position may thus be a LPS position of the terminal. Each data entry terminal can send its determined LPS position to the control unit.

These features may be advantageous, because the position of the data entry terminal and its user can be determined dynamically and highly exactly. The features can also allow using mobile data entry terminals such as mobile phones or netbooks whose position in a laboratory room may change dynamically.

According to some embodiments, the data entry terminal can automatically determine its own position repeatedly, for example, by a routine running on the data entry terminal and determining the current position of the data entry terminal on a regular basis. In particular, this can be done if the data entry terminal is a mobile data entry terminal as for example a mobile phone. The data entry terminal may send its LPS position respectively determined in each repeat to the control unit where determining, triggering, prohibiting and displaying can be executed upon each receipt of the LPS position. Depending on some rendering commands received from the control unit in response to the sent LPS position respectively, the display of the data entry terminal and the PS GUI elements shown therein can be updated.

Thus, an operator moving from one corner of a laboratory room to another and using for example a mobile phone as data entry terminal may be presented menus comprising different GUI elements depending on the user's current position in respect to the analyzer the user has logged into and/or has selected for executing a function.

Depending on the embodiment, the control unit may be part of the analyzer or may run on a separate controller processing device being coupled to one or more analyzers. The control unit may control the execution of functions of each of the one or more analyzers.

According to some embodiments, the method can further comprise receiving a terminal type ID. The terminal type ID can be indicative of a terminal type of the first data entry terminal. A mapping of terminal type IDs to function-IDs can be evaluated. Each terminal type ID can be mapped to one or more IDs of functions. The mapping can indicate that the terminal type represented by the terminal-type ID can be allowed to trigger any function whose function-ID is mapped to the terminal-type ID. The prohibition or display of GUI elements can be executed if the evaluation returns as result that the terminal type of the first data entry terminal is not allowed to trigger the function. The prohibition or display of GUI elements can be executed even if the position of the first data entry terminal is determined to be within the PO area.

These features may be advantageous because they may protect against the entry of erroneous analysis request and may protect against requests for executing a function which may cause harm to the analyzer or the analyzed samples. Depending on the embodiment, the mapping of terminal type IDs to function-IDs may be implemented as a binary file, as a text file, as a relational database, as an XML file or the like. The mapping may be stored to a computer readable storage medium being accessible by a control unit of the analysis system. The mapping of terminal-type IDs may be stored at the same or a different location as the mapping of terminal-IDs and analyzers.

According to some embodiments, one or more functions of the analyzer may be prohibited from being triggered by a mobile data entry terminal as for example a mobile phone. As the space of a mobile data entry terminal displays is often very limited, not all the information required for deciding if a particular function should be executed may be displayed on the screen of such a mobile data entry terminal. Thus, prohibiting a mobile data entry terminal user from triggering some functions of the analyzer may increase the safety of the analysis system.

According to some embodiments, the analyzer can execute one or more position sensitive functions (PS functions). 'Position sensitive' can mean that the user can be allowed or prohibited to trigger the analyzer to execute the function in dependence on the position of a data entry terminal receiving user-data from the user in relation to the analyzer. The user data may be, for example, log-in data. Each PS function can be a function whose execution can be prohibited if the position of the first data entry terminal is determined not to be within the PO area of the analyzer. The function represented by the PS GUI element may be one of the PS functions. The analyzer can execute one or more position insensitive (PI) functions. 'Position insensitive' can mean that the user can be allowed or prohibited to trigger the analyzer to execute the function irrespective of the position of a data entry terminal receiving user-data from the user in relation to the analyzer. Each PI function can be a function whose execution is to be allowed irrespective of a current position of the first data entry terminal receiving the log-in data or receiving a specification of a request to execute a function by the analyzer. The method can further comprise receiving a request from the first data entry terminal for executing the function of the analyzer; determining, if the requested function is one of the PS functions or one of the PI functions; if the requested function is one of the PS functions, executing determining, triggering prohibiting and displaying if the requested function is one of the PI functions, displaying a user activatable GUI element triggering the requested PI function upon activation, the displaying to be executed irrespective of whether the obtained position of the first data entry terminal is determined to be within the PO area. These features may be advantageous, because a user can remotely control at least some functions of the analyzer which can safely be triggered remotely, i.e., without risking to cause harm to the analyzer or the samples.

According to some embodiments, the activation of a user activatable PS GUI element can be executed by a user selecting the PS GUI element, for example by a mouse click on the user activatable GUI element. A non-activatable GUI element may not be selectable by a mouse click and may thus be not activatable by the user.

According to some embodiments, any one of the PS functions may be: opening or closing of a housing of the analyzer; starting a sample processing workflow to be executed on the analyzer; filling or re-filling the analyzer with consumables; locking a door of the analyzer; unlocking the door of the analyzer; loading biological samples into the analyzer; or unloading the biological samples from the analyzer. A consumable as used herein can encompass any item which may be consumed or discarded during the run of one or more analyses, e.g. reagents, pipettes, pipet tips, reagent containers, and the like.

According to some embodiments, any one of the PI functions may be: starting the analyzer; halting or stopping the sample processing workflow; shutting down the analyzer; hibernating the analyzer; booting the analyzer; executing data management functions; and forwarding measurement data collected by the analyzer to a LIMS or to another data entry terminal; or repeating a sample processing step. A data management function may be any data processing function for validating the measurement data, for example, a plausibility check, a comparison with reference values or an evaluation by a statistical test. A data management function may likewise comprise any data processing function for pre-processing and presenting the measurement data to the user for allowing the user to manually validate the data, for example, to execute a plausibility check by inspecting some displayed measurement values. Depending on the embodiment, the data management functions may be provided by computer-implemented routines provided by the analyzer or an analyzer control application program or by a middleware component being operable to receive the collected measurement data of the analyzer.

According to some embodiments, the method can further comprise: receiving, by the first data entry terminal, upon activation of the activatable PS GUI element displayed in triggering step, a signal. The signal can be indicative of the function whose execution is to be triggered. The first data entry terminal can automatically send a request to the control unit of the analyzer, the request specifying the function to be executed by the analyzer. The activation of the activatable PS GUI element may comprise selecting, by the user of the first data entry terminal, the activatable PS GUI element via the display of the terminal.

According to some embodiments, the control unit can receive the request from the first data entry terminal. Then, upon the receipt of the request, the control unit can send a command for executing the function to the analyzer. The analyzer having received the command can execute the indicated function in accordance with the command.

According to some embodiments, a rendering unit (RU) of the first data entry terminal can receive rendering commands from the control unit of the analyzer. The rendering commands can specify one or more GUI elements to be displayed to the user via the display of the first data entry terminal. The specification of the at least some of the GUI elements can depend on the result obtained by executing the determination step. A GUI element may be a button, a text, an image, a radio button group, a drop-down list, a pop-up window or the like. The displayed GUI elements may be part of a menu displayed to the user after a successful log-in operation whereby properties the GUI elements and/or properties of the menu may depend on the result of executing the determination step. A menu can be any GUI component such as a window, a scroll pane, a fixed pane or the like acting as a container for one or more GUI elements to be collectively presented to a user. A GUI element may be activatable and may trigger, upon activation, the execution of a function by the analyzer, whereby the function can comprise a physical action of the analyzer. In this case, a GUI element may act as PS GUI element. Alternatively, a GUI element may represent a non-physical action to be executed by the analyzer such as returning some measurement results or may display to the user some information on the analyzer, for example, its status, or some information on the analyzed samples. Thus, a GUI element may be a purely informative GUI element, for example, a text comprising status information of a particular analyzer.

The rendering commands may comprise commands for rendering one or more GUI elements. The rendering unit can render the commands having been received from the control unit. Then, the one or more GUI elements can be displayed depending on the received rendering commands. The features may be advantageous as a GUI is displayed whose content may comprise triggering a function of an analyzer, whereby the content may depend on the current position of the user in respect to that analyzer. The log-in operation may be a log-in operation authenticating the user at the one analyzer. According to some embodiments, an analysis system may comprise a plurality of analyzers and the log-in data may authenticate the user at the analysis system. The user may be presented a GUI element on the display of the first data entry terminal allowing the user to select one of the analyzers of the analysis system. Further GUI elements may allow the user to select and activate a function of the selected analyzer. The selection of one of the analyzers or the receipt of the user's log-in data may trigger the execution of determination, triggering, prohibition and display steps in respect to the selected analyzer.

Depending on the embodiment, the rendering commands may be received by the first data entry terminal after a successful authentication of the user at the analyzer or at an LIMS managing access to one or more analyzers of an analysis system. The log-in at the one or more analyzers may be managed according to some embodiments by a laboratory information management system (LIMS) or a component of middleware of a laboratory operating one or more analyzers. According to embodiments, a plurality of analyzers (or 'cluster' of analyzers) may be part of an analysis system. A user having successfully logged into the analysis system or into a middleware component managing user access rights in respect to the analysis system may have authenticated at a subset of the analyzers. The subset may comprise one or more analyzers.

According to some embodiments, the user can automatically be logged-off after a lapse of a predefined time period during which no user data was entered into the first data entry terminal and the displaying of any activatable PS GUI element to the user via the data entry terminal can be prohibited. Thus, it can be prohibited that a function can be executed by the analyzer although the user having triggered the execution of the function has already left the PO area of the analyzer.

According to some other embodiments, access to functions of the analyzer by the user can automatically be prohibited after a lapse of the predefined time period during which no user data was entered into the first data entry terminal. This can be achieved by a lock-function of the analyzer, by a lock function of an analysis system comprising the analyzer or by a lock-function of a middleware controlling the analysis system. Such a lock to prohibit the access to functions can be restricted to position sensitive functions, thereby allowing the user after the lock to still execute functions which are not position sensitive functions and not bearing any risk of causing harm to the analyzer or the analyzed samples.

In a further aspect, a computer-readable non-transitory storage medium comprising instructions which when executed by a processor can cause the processor to execute the method steps according to any one of the above mentioned embodiments.

In a further aspect, an analysis system can comprise one or more analyzers and at least one control unit. The at least one control unit can receive a user's log-in data from a first data entry terminal. The first data entry terminal can comprise a display. The log-in data can be used for authenticating the user at one of the one or more analyzers. The control unit can further obtain information descriptive of a position of the first data entry terminal and can execute determining if the position of the first data entry terminal is within a physical operating PO area of the one analyzer, triggering the displaying of a user activatable position sensitive (PS) GUI element on the display of the first data entry terminal when the position of the first data entry terminal is determined to be within the PO area. The user activatable PS GUI element can trigger, upon activation, the execution of the function of the one analyzer, the execution of the function comprising the execution of a physical action by the analyzer, otherwise prohibiting the display of the user activatable PS GUI element or displaying a non-activatable PS GUI element indicative of the function.

According to further embodiments, the analysis system can further comprise the first data entry terminal and the terminal's display. The display can display the user activatable PS GUI element and/or the non-activatable PS GUI element. The data entry terminal can automatically determine its own terminal-ID and/or determine by a local positioning system (LPS), the position of the data entry terminal. The determined position can be a LPS position. If the data entry terminal can determine its own LPS position, it may be interoperable with one or more computers or base stations for determining its position or for receiving its LPS position from the other computers or base stations. The data entry terminal can then send its LPS position and/or the determined terminal-ID to the control unit of the analyzer.

According to some embodiments, the analysis system can comprise one or more further data entry terminals which can respectively comprise the same features as embodiments of the first data entry terminal described before. In particular, each of the further data entry terminals can comprise a display. The first data entry terminal may be within the PO area of at least one of the analyzers and at least one of the further data entry terminals may not lie within the PO area of the at least one analyzer. According to this embodiment, the first data entry terminal can display the activatable PS GUI element upon receiving the log-in data from the user from the first data entry terminal, the receipt being followed by the execution of the determination, triggering, prohibition or display steps. The log-in data can authenticate the user at the at least one analyzer. The at least one further data entry terminal can display the non-activatable PS GUI element upon receiving the log-in data of the user from the at least one further data entry terminal. Upon the receipt of the log-in data, the determination, triggering, prohibition or display steps can be executed and the log-in data can be used for authenticating the user at the at least one analyzer. Thus, if the user enters his log-in data at the first terminal lying within the PO area of the at least one analyzer, the user may be presented the activatable PS GUI element, wherein if the user enters his log-in data into the at least one further data entry terminal not lying within the PO area, the user can be presented the non-activatable GUI element.

According to some embodiments, a data entry terminal may be a processing unit being an integral part of one of the analyzers; an analyzer control coupled to one of the analyzers; a mobile phone; or a desktop computer or a notebook coupled to the control unit via a network. The network may for example be the Internet or an intranet.

According to some embodiments, each of the data entry terminals can comprise a user identification component for identifying a user and/or can comprise a position identification component for identifying the terminal-ID and/or the current position of the data entry terminal. In addition, or alternatively, each data entry terminal can comprise an interface component for sending the log-in data and/or a request for executing a function by one of the analyzers to the control unit, the request comprising a user identifier of the identified user and comprising the terminal-ID and/or current position.

According to some embodiments, the method can further comprise receiving, by the control unit, a user's request for executing a function by the analyzer, the request being received from the first data entry terminal. The request may comprise an indication of the requested function, a user-ID of the authenticated user and a terminal-ID of the first data entry terminal and/or a position of the data entry terminal; the request may also comprise a terminal-type ID; upon the receipt of the request, the control unit can obtain information descriptive of a position of the first data entry terminal and repeats the execution of the determination, triggering, prohibition or display steps, whereby the activatable PS GUI element and the non-activatable PS GUI element represent the requested function. The expression "executing the determination, triggering, prohibition or display steps" as used herein can imply executing either the determination and triggering steps or executing the determination, prohibition or display steps depending on the result of the determination step.

According to some embodiments, the first data entry terminal can receive a specification of the request for executing the function by the analyzer. The request can be sent by the first data entry terminal to the control unit. The control unit can evaluate the data contained in the request when executing the determination step. The control unit can create rendering commands depending on the result of the determination step and can send the rendering commands to the first data entry terminal. If it is determined that the position of the first data entry terminal is within the PO area of the analyzer, the control unit can send first rendering commands to the first data entry terminal, the first rendering commands can cause the terminal to display a user activatable PS GUI element representing a function of the analyzer to be triggered by activating the PS GUI element. If it is determined that the position of the first data entry terminal is not within the PO area of the analyzer, the control unit can send second rendering commands to the first data entry terminal, the second rendering commands can cause the terminal to display a non-activatable PS GUI element representing the function. According to some embodiments, neither first nor second rendering commands can be sent in case the terminal is not within said PO area. If the first data entry terminal receives the first rendering commands, it can display the user activatable PS GUI element on its display. If the second rendering commands are received or if neither the first or second rendering commands were received by the terminal, the display of the user activatable PS GUI element can be prohibited or the non-activatable PS GUI element can be displayed.

According to some embodiments, the non-activatable PS GUI element can further comprise an indication of another data entry terminal. The other data entry terminal can lie within the PO area of the analyzer at which the user has authenticated and/or from which the user has requested the execution of the function. The indication may be a further GUI element, for example, a pop-up dialog window or a tooltip dialog window. Thus, the user can be notified of a terminal permitting the execution of the requested functionality he or she cannot access from the first data entry terminal.

Figure 1:
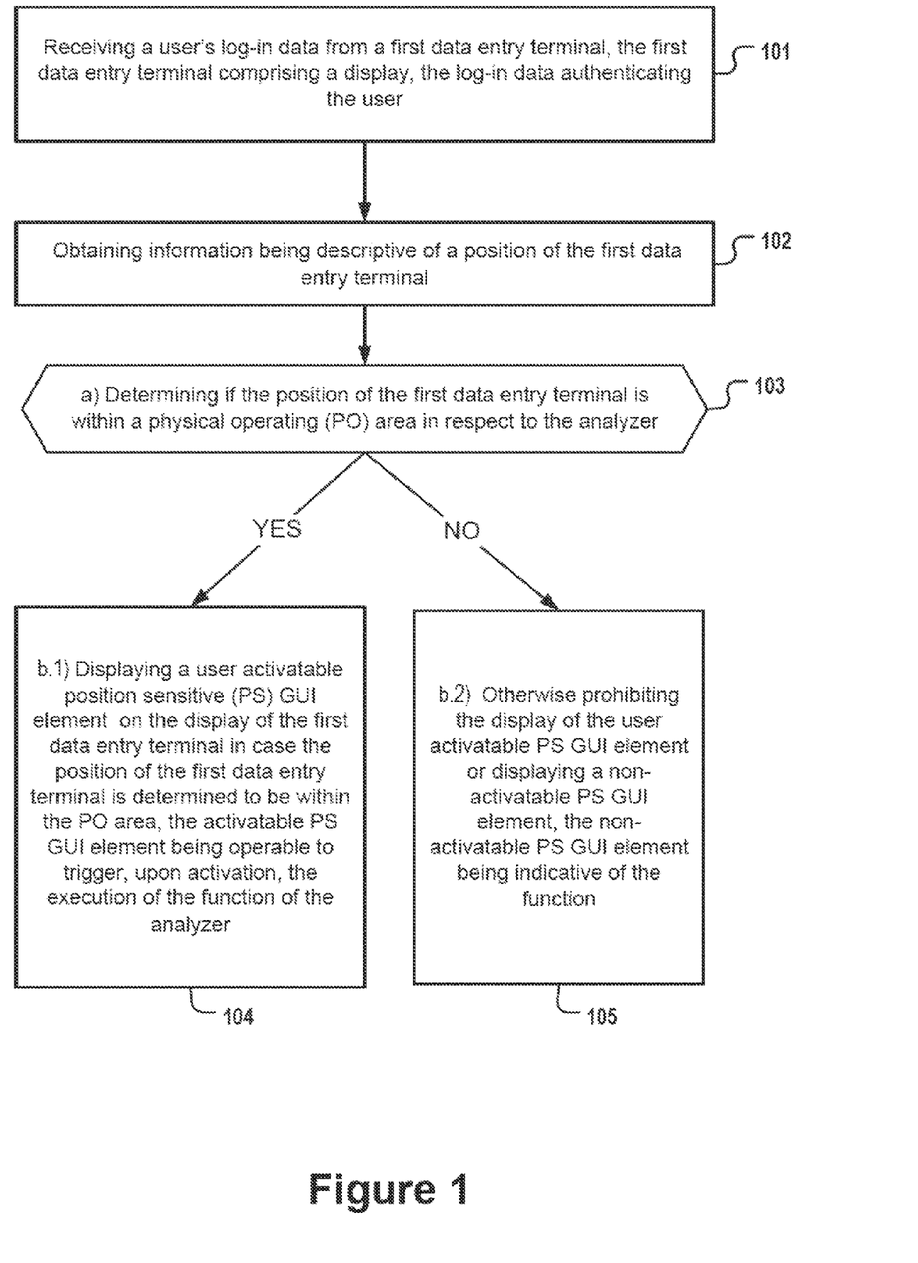
FIG. 1 illustrates a method executed by an analysis system according to an embodiment of the present disclosure.
Figure 2A:
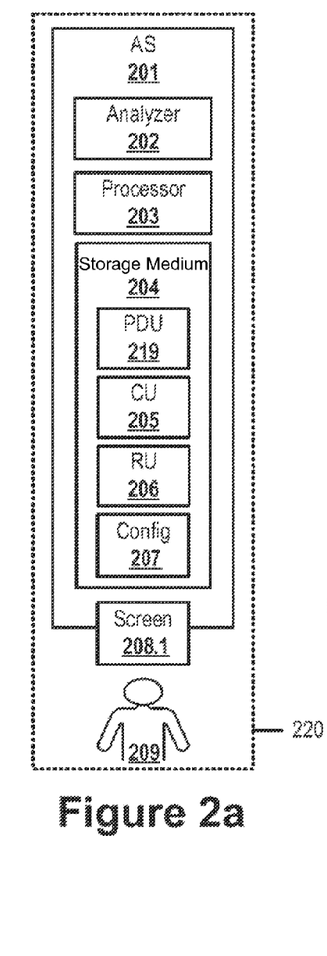
FIGS. 2a-c illustrate different embodiments of an analysis system of the present disclosure.

Referring initially to FIG. 1, FIG. 1 illustrates a method executed by an embodiment of an analysis system as depicted, for example, in one of the FIG. 2a, 2b, 2c or 3. In step 101, a control unit 205 can receive log-in data from a user 209, the log-in data having been entered into a first data entry terminal 201, 210, 213, 301-303 for example, via a screen 208 or a keyboard. The received log-in data can be used for authenticating the user at one or more analyzers belonging to the analysis system 201, 224, 211, 300. In step 102, the control unit can obtain information descriptive of a position of the first data entry terminal from which the log-in data was received. In step 103, the control unit 205 can determine if the position of the first data entry terminal is within a PO area 220 of analyzer 202. The PO area of analyzer 202 is depicted in FIG. 2a by the dotted rectangle 220, in FIG. 2b by rectangle 221 and in FIG. 2c by rectangle 222. The PO area of analyzer 212 is indicated by the dotted rectangle 223 in FIG. 2c. If it is determined in step 103 that the position of the first data entry terminal is within the PO area of a particular analyzer, step 104 can be executed and a user activatable PS GUI element can be displayed on the display of the first data entry terminal having received the log-in data or having received a request of the user for executing a function of the analyzer. The displayed activatable PS GUI element can trigger, upon activation by a user, the execution of one of the functions of the analyzer. If it is determined that the position of the first data entry terminal is not within the PO area of the analyzer, step 105 can be executed. Step 105 can comprise prohibiting the display of the user activatable PS GUI element or displaying a non-activatable PS GUI element indicative of the function which cannot be triggered by the user remotely.

FIG. 2 illustrates various embodiments of an analysis system. FIG. 2a depicts a analysis system 201 comprising an analyzer 202, a processor 203 and a plurality of functional modules stored in a storage medium 204. All components can be contained in a single housing. The user 209 may enter his log-in data via the display 208.1. The analysis system 201 can thus provide the functions of a data entry terminal in combination with the functions provided by an analyzer. As the display 208.1 is within the PO area 220 of the analyzer 202, the activatable PS GUI element can be displayed to the user on the display. Any combination of an inputs for the log-in data or for entering a request and a display of the analysis system 201 in this case may act as terminal. The modules on storage 204 may comprise a position determination (PDU) module 219. The PDU module can determine a terminal-ID indicative of the position of the terminal and/or can determine the position of the terminal directly, for example, as an LPS position.

The system can further comprise a control unit 205 for determining, depending on the position of the data entry terminal, if and which kind of GUI elements can be displayed to the user 209 via the display 208.1. A rendering unit 206 can receive rendering commands from the control unit 205 and can render and display one or more GUI elements in accordance with the rendering commands for displaying the GUI elements on the screen 208.1. A configuration 207 may comprise a mapping of function IDs and terminal-type-IDs. The configuration may in addition or alternatively comprise a timetable specifying time periods during which one or more specified functions of the analyzer 202 may be executed, and/or may comprise some user profiles. The control unit 205 may access the configuration 207 for determining if one or more GUI elements can or cannot be displayed according to the location of the data entry terminal or cannot be displayed for other reasons, for example, for lack of permission or because a requested function is prohibited during a particular time period.

Figure 2B:
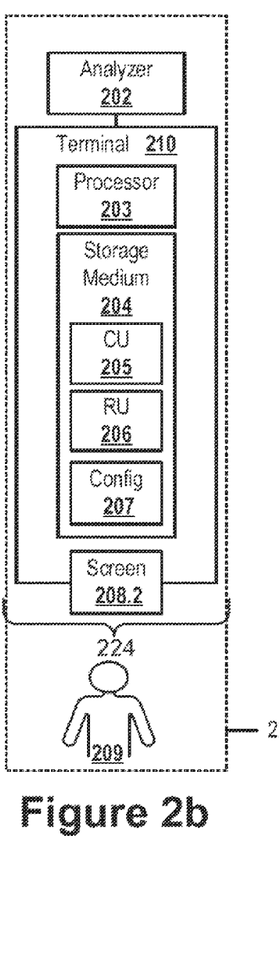

FIG. 2b depicts an embodiment of an analysis system 224 wherein the analyzer 202 can be connected to the data entry terminal 210 via a network. The PO area 221 of analyzer 202 is depicted by a dotted rectangle.

Figure 2C:
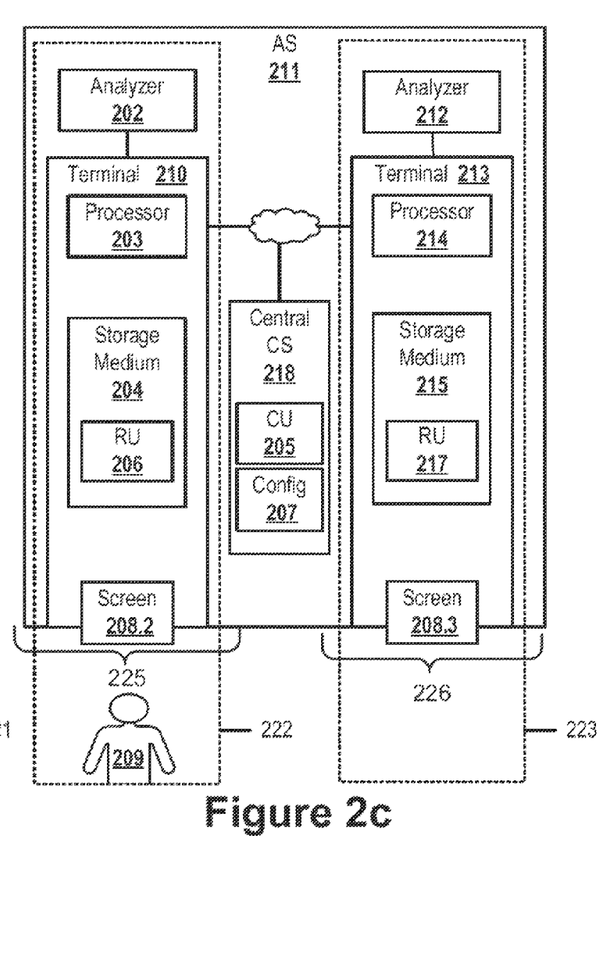

FIG. 2c depicts an analysis system 211 comprising two analyzers 202, 212 respectively connected to a data entry terminal 210, 213. The system can further comprise a central computer system 218 which can comprise the control unit 205 and the configuration 207. The data entry terminals can respectively comprise the rendering units 206, 217 on respective storage media 204, 215 and can also comprise displays 208.2, 208.3. They may also comprise a PDU module respectively (not shown). Any log-in data entered by the user 209 into any one of the displays 208.2, 208.3 of the analysis system 211 and any request for executing a function of one of the analyzers 202, 212 by the analyzer can be submitted by the respective data entry terminal to control unit 205 of the central computer system 218. The control unit 205 can evaluate the log-in data or the request for executing a function of one of the analyzers 202, 212 and also can evaluate the position of the data entry terminal having submitted the log-in data or the request. Depending on the position of the terminal in respect to the analyzer at which the user has logged in or from which the execution of the function is requested, the control unit 205 can create rendering commands and can send the rendering commands to the rendering unit 206, 217 of the terminal having sent the log-in data or the function request. The combination 225 of a terminal and an analyzer may be implemented, for example, as a combination of an analyzer control computer 210 acting as terminal and a respectively controlled analyzer 202. The same can hold true for the combination 226 comprising analyzer 212 and an analyzer control computer 213 acting as terminal. Contrary to state-of-the-art analysis systems, each of the terminals may be used not only to control its corresponding analyzer, but also to control at least some PI functions of another analyzer. The PI functions can be 'harmless' functions which cannot cause any harm to the analyzer or the analyzed samples even if executed remotely. For example, a user 209 having logged into the analyzer 212 via inputs provided by terminal 210 may still be able to monitor and execute some (harmless) functions of analyzer 212, while other functions potentially being harmful when executed remotely may only be displayed on screen 208.3 but not on display 208.2.

Figure 3:
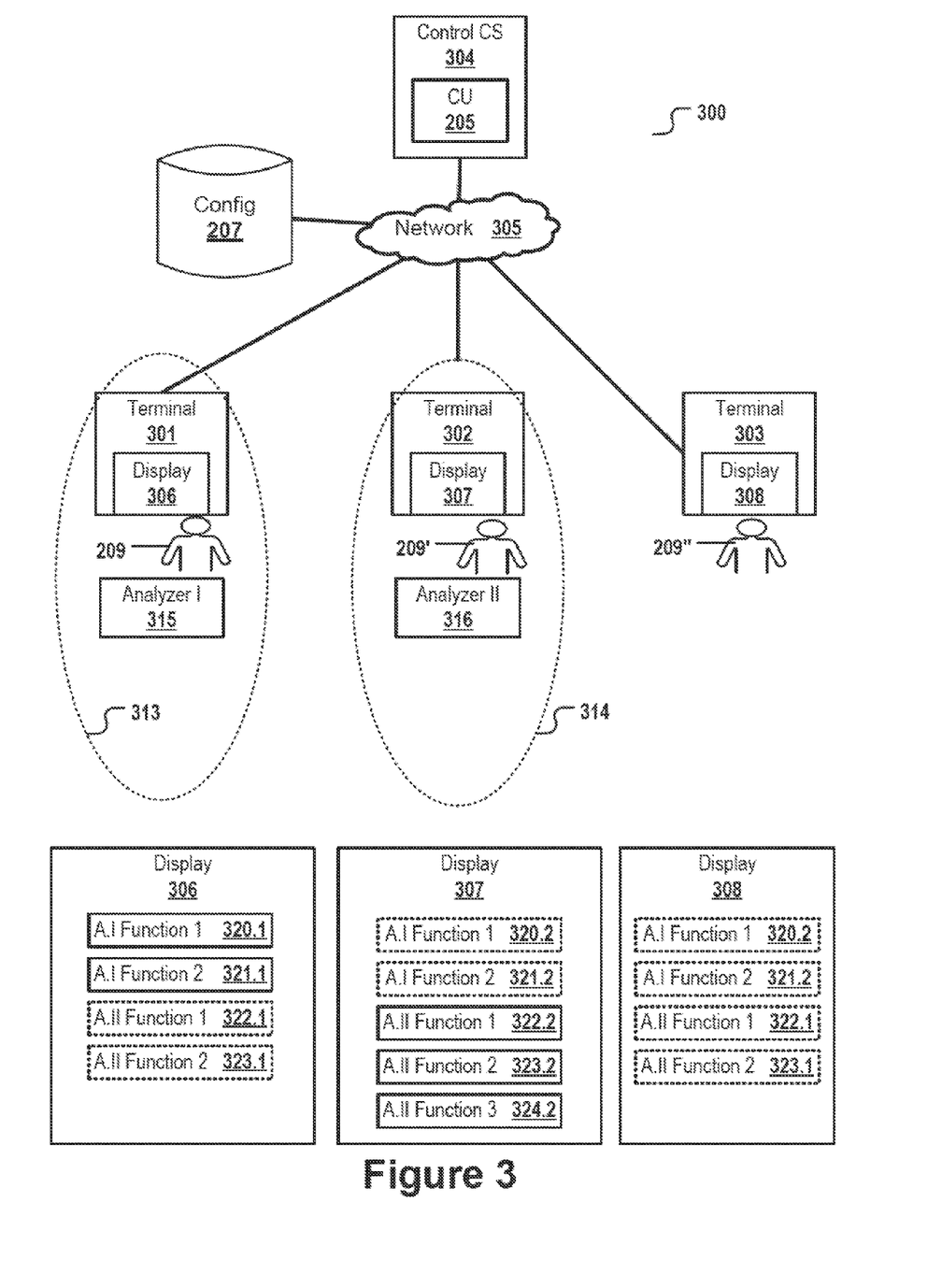
FIG. 3 illustrates an analysis system comprising three terminals and their respective displays according to an embodiment of the present disclosure.

FIG. 3 illustrates an analysis system 300 comprising three terminals 301-303 and their respective displays 306-308. Terminal 301 is within the PO area 313 of analyzer 315 but outside the PO area 314 of analyzer 316. The terminal 302 is within the PO area 314 of analyzer 316 but outside the PO area 313 of analyzer 315. Terminal 303 is not within the PO area 313, 314 of any of the analyzers 315, 316. It may be any computer being connected to the analysis system for example, via a LIMS of a laboratory.

The analysis system 300 can comprise one central control computer system 304 comprising one central control unit 205. The analyzers, terminals and the control computer can be connected to each other via network 305. The configuration 207 can be provided by a relational database accessible by the control unit 205.

The GUI elements are depicted via displays 306, 307 and 308 in greater detail at the bottom of FIG. 3. A user 209 may have entered his log-in data or have requested the execution of a function of one of the analyzers via terminal 301. The display 306 can display, as a consequence, the activatable PS GUI elements 320.1 and 321.1, respectively allowing the user to trigger the execution of a PS or a PI function of analyzer 315. In addition, non-activatable PS GUI elements 322.1 and 323.1 indicated by dotted boxes can be displayed, respectively indicating that the user is not allowed to remotely trigger a PS or a PI function of the analyzer 316 from his current position. This can be because the user 209 is currently at a terminal 301 lying within the PO area 313 of analyzer 315 but lying outside the PO area 314 of analyzer 316.

A user 209' may have entered his log-in data or may have requested the execution of a function of one of the analyzers via terminal 302. Display 307 can display, as a consequence, the non-activatable PS GUI elements 320.2 and 321.2, respectively prohibiting the user from triggering the execution of the PS or the PI function of analyzer 315. In addition, activatable PS GUI elements 322.2 and 323.2 can be displayed, respectively indicating that the user is allowed to trigger the PS or the PI function of the analyzer 316 from his current position. This can be because the user 209' is currently at a terminal 302 lying within the PO area 314 of analyzer 316 but outside the PO area 313 of analyzer 315. A third function of analyzer 316 can be represented by a activatable PS GUI element 324.2 which can only be displayed on display 307 and can never be displayed via any remote data entry terminal.

A user 209" may have entered his log-in data or may have requested the execution of a function of one of the analyzers via terminal 303. Display 308, as a consequence, can display the non-activatable PS GUI elements 320.2, 321.2 in respect to analyzer 315 and 322.1 and 323.1 in respect to analyzer 316. Thus, the user cannot execute any of the functions represented by the non-activatable PS GUI element remotely from terminal 303.

Figure 4:
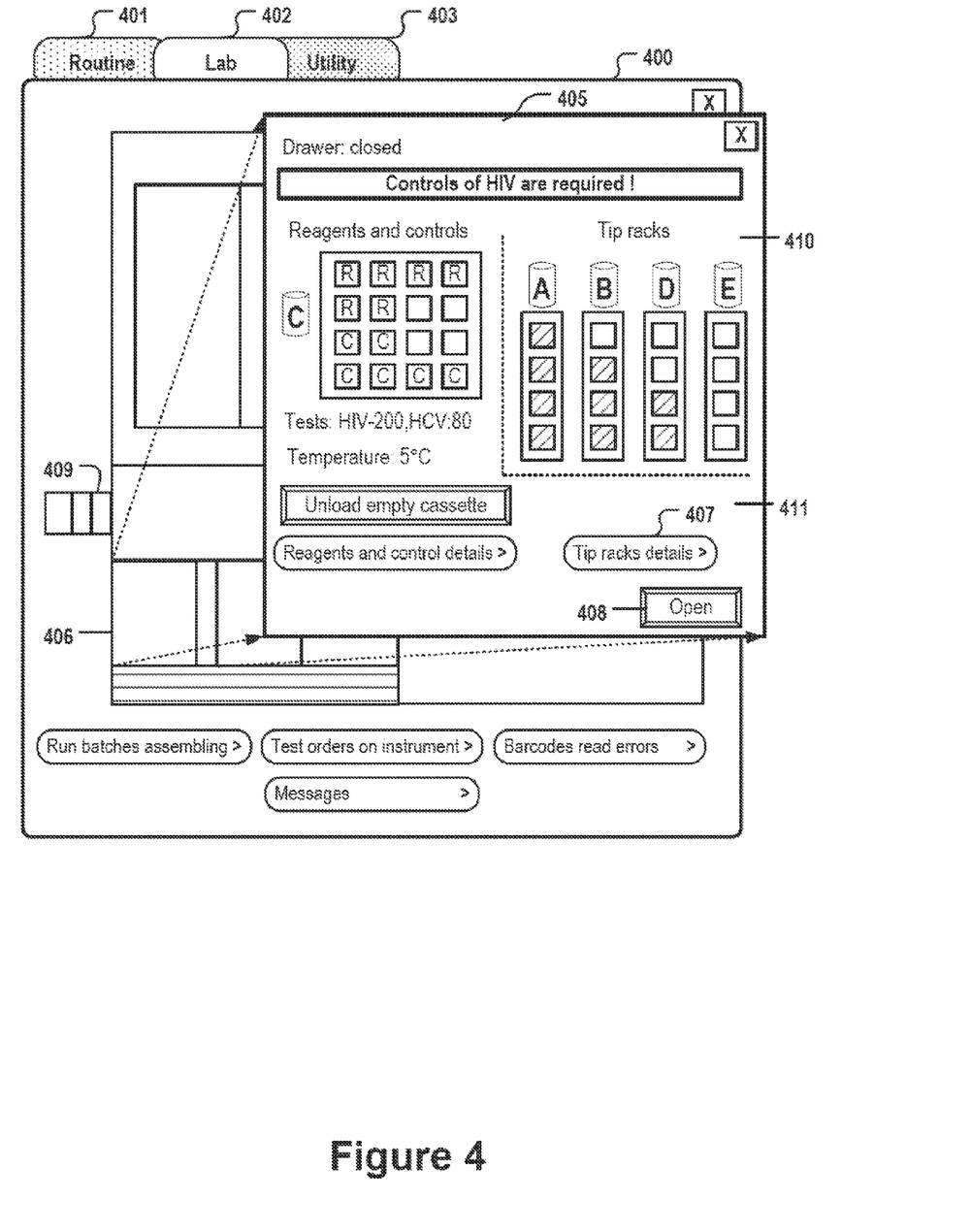
FIG. 4 illustrates a menu displayed to a user via display, the menu comprising multiple GUI elements for monitoring and controlling an analyzer according to an embodiment of the present disclosure.

FIG. 4 depicts a menu 400 of a GUI as displayed to a user via display 306 in respect to analyzer 315 after a successful log-in operation of the user at terminal 301. The menu can comprise tabs 401, 402, and 403 for selecting different GUI windows. The currently selected window of tab 402 can comprise some GUI elements 406, 409 respectively representing an analyzer or parts or consumables of the analyzer. GUI element 406 can represent a drawer, for example, a sample cell drawer, of an analyzer 315. Upon selecting GUI element 406, a window 405 can be displayed comprising a first area 410 and a second area 411. The first area can comprise GUI elements representing 4 tip racks A, B, D and E. The second window area can show a selected tip rack, C, in greater detail. Full reagent vessels can be indicated by boxes "R", full control containers by boxes "C", and empty tip rack containers and reagent vessels by empty boxes. Some GUI elements 407 representing 'harmless' function such as displaying additional information in respect to components of the analyzer can be displayed as activatable GUI elements irrespective of the position of the data entry terminal. Other GUI elements, for example, activatable PS GUI element 408, can be displayed because determination step 103 determined that data entry terminal 301 lies within the PO area of some of the analyzer 315 whose components are represented by GUI element 406.

Figure 5:
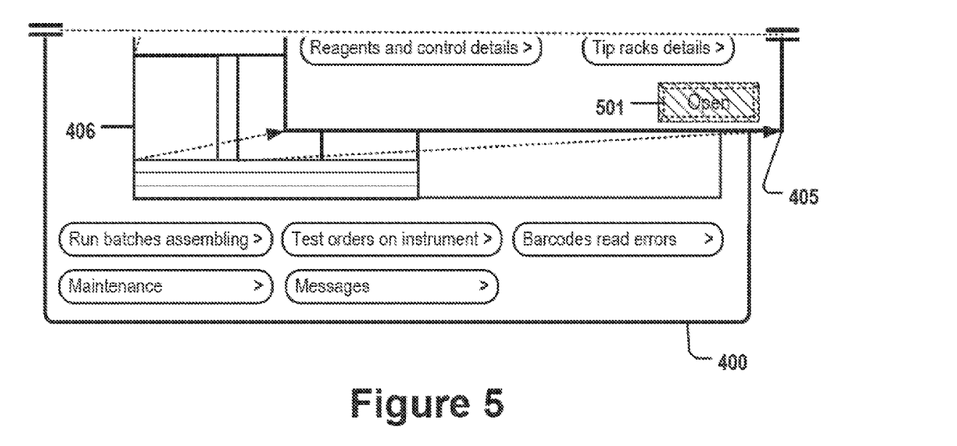
FIG. 5 illustrates a modified version of the menu displayed to the user via display according to an embodiment of the present disclosure.

FIG. 5 depicts a menu for controlling some functions of the drawer of analyzer 315, whereby the GUI elements of the menu can comprise those GUI elements displayed to a user 209' via display 307. The GUI elements can differ from the GUI elements displayed to the user 209 via display 307 in that instead of the activatable PS GUI element 408, a non-activatable PS GUI element 501 can be shown, notifying a user that he is not permitted to trigger the opening of the door of the drawer of the analyzer 315 remotely.

Figure 6:
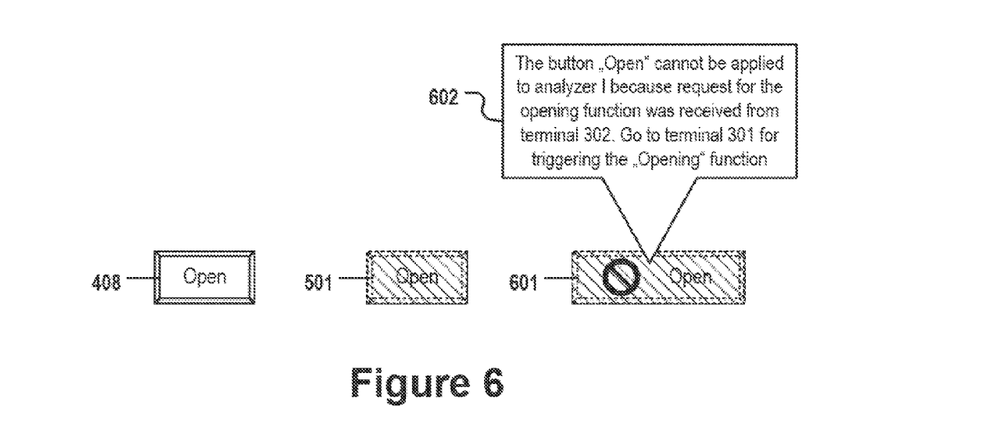
FIG. 6 illustrates one activatable and two non-activatable PS GUI-elements according to an embodiment of the present disclosure.

FIG. 6 depicts a non-activatable PS GUI element according to another embodiment, whereby the user can be notified, via window 602, that the user cannot be allowed to trigger the function represented by the GUI element 602. The window may in addition comprise an indication of a cause for not being allowed to trigger the function, for example, because the user has logged into a remote terminal in respect to the analyzer executing the function. Or the user may lack the necessary permissions or may have requested a function during an inadmissible time period. Further, the window 602 may comprise a hint for the user what to do and/or to which terminal to go in order to trigger the execution of the function represented by the non-activatable PS GUI element. The window 602 may be implemented for example as a tooltip or pop-up window which can be displayed upon a mouse-over event or a single- or double click event applied on GUI element 601.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A computer-implemented method for providing access control to a function of an analyzer, the method comprising:
   receiving a user's log-in data from a first data entry terminal, wherein the first data entry terminal comprises a display and wherein the log-in data authenticates the user;
   obtaining information descriptive of a position of the first data entry terminal wherein obtaining comprises obtaining a terminal-ID of the first data entry terminal;
   determining whether the position of the first data entry terminal is within a physical operating (PO) area of the analyzer, wherein determining comprises accessing a configuration comprising a mapping of one or more terminal-IDs to the analyzer and wherein each data entry terminal whose ID is mapped to the analyzer lies within the PO area of the analyzer;
   displaying a user activatable position sensitive (PS) GUI element on the display of the first data entry terminal if the position of the first data entry terminal is determined to be within the PO area, wherein the activatable PS GUI element triggers, upon activation, execution of the function by the analyzer and wherein the execution of the function comprises execution of a potentially harmful physical action by the analyzer, and wherein the execution of the potentially harmful physical action is restricted by the physical proximity of the user to the analyzer so that the potentially harmful physical action is supervised by the user;
   otherwise prohibiting the display of the user activatable PS GUI element or displaying a non-activatable PS GUI element, wherein the non-activatable PS GUI element is indicative of the function; and
   determining if the obtained terminal-ID is mapped to the analyzer for determining whether the position of the first data entry terminal is within the PO area of the analyzer.

2. The computer-implemented method according to claim 1, wherein obtaining information descriptive of the position of the first data entry terminal comprises obtaining a LPS position of the first data entry terminal, wherein the LPS position is determined by a local positioning system (LPS).

3. The computer-implemented method according to claim 2, wherein determining comprises,
   determining a spatial distance of the LPS position of the first data entry terminal relative to the position of the analyzer; and
   determining if the spatial distance is below a spatial distance threshold, wherein the spatial distance threshold specifying a maximum distance allowing the user to physically interact with the analyzer.

4. The computer-implemented method according to claim 1, the method further comprising,
   receiving a terminal type ID, wherein the terminal type ID is indicative of a terminal type of the first data entry terminal;
   evaluating a mapping of terminal type IDs to function-IDs, wherein each terminal type ID is mapped to one or more IDs of functions, wherein the mapping indicates that the terminal type represented by the terminal-type ID is allowed to trigger any function whose function-ID is mapped to the terminal-type ID; and
   executing the prohibition of the display of the user activatable PS GUI element or the display of the non-activatable PS GUI element if the evaluation returns as result that the terminal type of the first data entry terminal is not allowed to trigger the function, wherein the prohibition of the display of the user activatable PS GUI element or the display of the non-activatable PS GUI element is executed even when the position of the first data entry terminal is determined to be within the PO area.

5. The computer-implemented method according to claim 1, the method further comprising,
   automatically determining by the first data entry terminal its own position with a local positioning system (LPS); and
   sending the determined LPS position from the first data entry terminal to a control unit of the analyzer.

6. The computer-implemented method according to claim 1, wherein the analyzer executes one or more position sensitive (PS) functions, wherein each PS function is a function whose execution is to be prohibited when the position of the first data entry terminal is determined not to be within the PO area.

7. The computer-implemented method according to claim 6, wherein the one or more PS functions are selected from a group comprising: opening or closing a housing of the analyzer; filling or re-filling the analyzer with consumables; starting a sample processing workflow to be executed on the analyzer; locking a door of the analyzer; unlocking the door of the analyzer; loading biological samples into the analyzer; and/or unloading the biological samples from the analyzer.

8. The computer-implemented method according to claim 6, wherein the analyzer executes one or more position insensitive (PI) functions, wherein each PI function is a function whose execution is to be allowed irrespective of a current position of the first data entry terminal receiving the log-in data.

9. The computer-implemented method according to claim 6, further comprising,
receiving, by the first data entry terminal, upon activation of the activatable PS GUI element a signal indicative of the function whose execution is to be triggered; and
automatically sending a request from the first data entry terminal to a control unit of the analyzer, wherein the request specifying the function to be executed by the analyzer.

10. The computer-implemented method of claim 9, further comprising,
receiving, by the control unit, the request from the first data entry terminal;
sending, by the control unit, a command for executing the function to the analyzer upon the receipt of the request;
executing the indicated function by the analyzer in accordance with the command.

11. The computer-implemented method according to claim 8, wherein the one or more PI functions are selected from a group comprising: starting the analyzer; halting or stopping the sample processing workflow; shutting down the analyzer; hibernating the analyzer; booting the analyzer; forwarding measurement data collected by the analyzer to a laboratory information management system (LIMS) or to another data entry terminal; executing data management functions; and/or repeating a sample processing step.

12. The computer-implemented method according to claim 8, the method further comprising,
determining, if the function is one of the PS functions or one of the PI functions; and
if the requested function is one of the PI functions, displaying a user activatable GUI element for triggering the requested PI function upon selection, wherein the displaying to be executed irrespective of whether the obtained position of the first data entry terminal is determined to be within the PO area.

13. The computer-implemented method according to claim 1, further comprising:
receiving, by a rendering unit of the first data entry terminal rendering commands from a control unit of the analyzer, wherein the rendering commands specifying one or more GUI elements to be displayed to a user via the display, and wherein the specification of the one or more GUI elements depends on a result of the determination of whether the position of the first data entry terminal is within a PO area of the analyzer; and
displaying the one or more GUI elements in dependence on the received rendering commands.

14. An analysis system, the analysis system comprising:
one or more analyzers;
a first data entry terminal coupled to the one or more analyzers, wherein the first data entry terminal comprises a display; and
at least one control unit, wherein the at least one control unit receives a user's log-in data from the first data entry terminal and obtains information descriptive of a position of the first data entry terminal, wherein the log-in data authenticates the user at at least one of the one or more analyzers;
wherein whether the position of the first data entry terminal is within a physical operating (PO) area of the analyzer is determined by obtaining a terminal-ID and determining if the obtained terminal-ID is mapped to the analyzer according to a predetermined mapping of the date entry terminal-ID to the analyzer, wherein displaying of a user activatable position sensitive (PS) GUI element is triggered on the display of the first data entry terminal when the position of the first data entry terminal is determined to be within the PO area, wherein the activatable PS GUI element is triggered, upon activation, execution of a function of the one analyzer, wherein the execution of the function comprising execution of a potentially harmful physical action by the analyzer, wherein the execution of the potentially harmful physical action is restricted by the physical proximity of the user to the analyzer so that the potentially harmful physical action is supervised by the user, and wherein the display of the user activatable PS GUI element is otherwise prohibited or a non-activatable PS GUI element indicative of the function is displayed.

15. The analysis system according to claim 14, wherein the display of the first data entry terminal displays the user activatable PS GUI element and/or the non-activatable PS GUI element, wherein the first data entry terminal automatically determines its own terminal-ID and/or its own LPS position with a local positioning system (LPS) and sends the determined LPS position and/or the determined terminal-ID from the first data entry terminal to the control unit of the analyzer.

16. The analysis system according to claim 14, further comprising,
one or more second data entry terminals respectively comprising a display, wherein the first data entry terminal is within the PO area of the at least one analyzer, wherein at least one of the second data entry terminals is not within the PO area of the at least one analyzer, wherein the first data entry terminal displays the activatable PS GUI element upon receiving the log-in data from the user from the first data entry terminal, wherein the receipt being followed by the execution of determining whether the position of the first data entry terminal is within a physical operating (PO) area of the analyzer, displaying a user activatable position sensitive (PS) GUI element on the display of the first data entry terminal if the position of the first data entry terminal is determined to be within the PO area and otherwise prohibiting the display of the user activatable PS GUI element or displaying a non-activatable PS GUI element, the log-in data authenticating the user at the at least one analyzer and wherein the second data entry terminal is adapted for displaying the non-activatable PS GUI element upon receiving the log-in data of the user from the at least one second data entry terminal, the receipt being followed by a further execution of determining whether the position of the first data entry terminal is within a physical operating (PO) area of the analyzer, displaying a user activatable position sensitive (PS) GUI element on the display of the first data entry terminal if the position of the first data entry terminal is determined to be within the PO area and otherwise prohibiting the display of the user activatable PS GUI element or displaying a non-activatable PS GUI element, the log-in data authenticating the user at the at least one analyzer.

* * * * *